Figure 1:
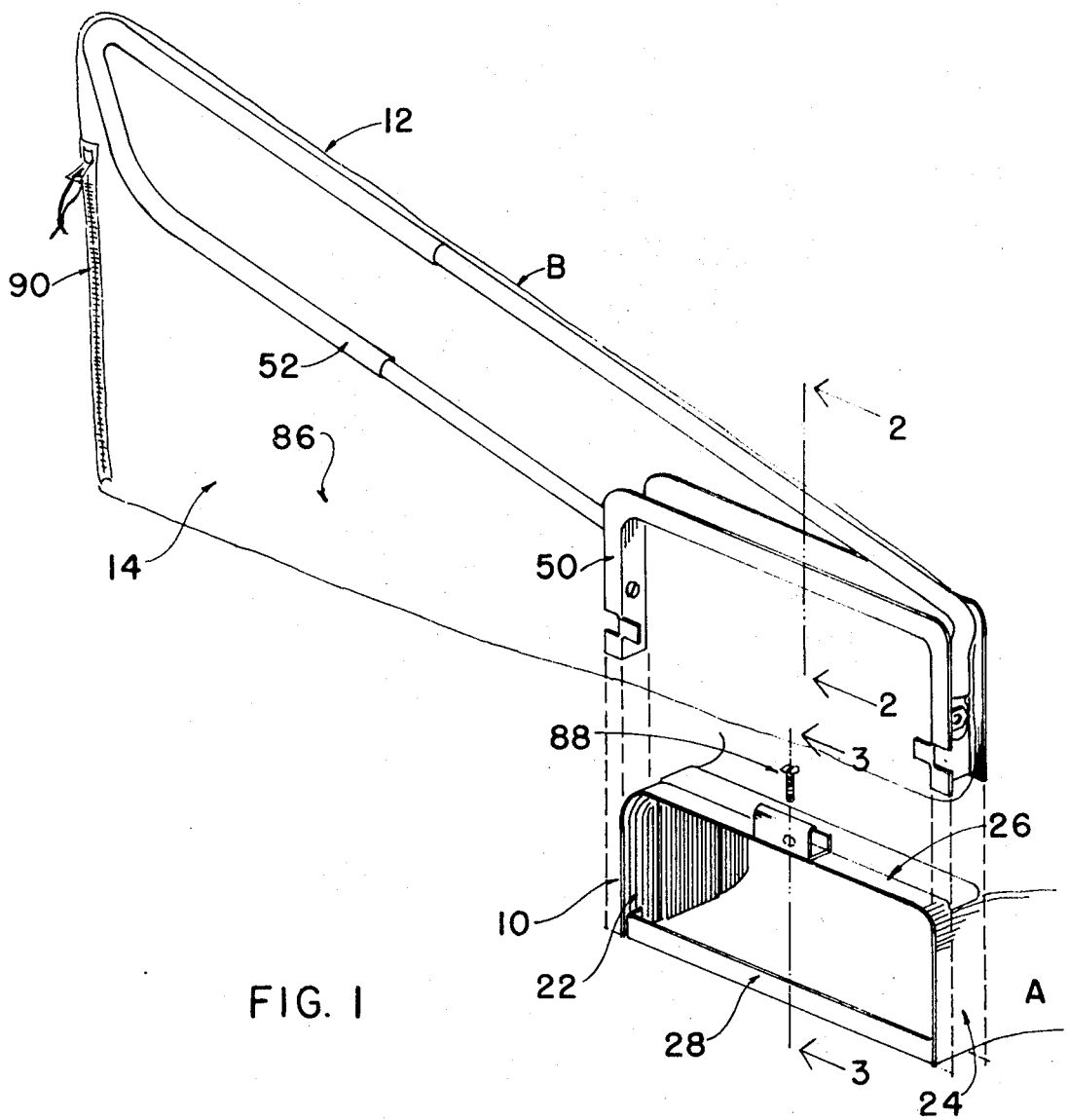

United States Patent [11] 3,624,699

| [72] | Inventor | Ralph L. Hoffmann<br>St. Louis County, Mo. |
|---|---|---|
| [21] | Appl. No. | 18,502 |
| [22] | Filed | Mar. 11, 1970 |
| [45] | Patented | Nov. 30, 1971 |
| [73] | Assignee | Perfection Manufacturing Company |

[54] GRASS-CATCHING ATTACHMENTS
2 Claims, 4 Drawing Figs.

[52] U.S. Cl. ..................................................... 56/202
[51] Int. Cl. ....................................................... A01d 35/22
[50] Field of Search ............................................ 56/202

[56] References Cited
UNITED STATES PATENTS

| 2,932,146 | 4/1960 | Campbell | 56/202 |
| 3,047,998 | 8/1962 | Leader et al. | 56/202 |
| 3,197,949 | 8/1965 | Waag | 56/202 |
| 3,213,600 | 10/1965 | Anderson | 56/202 |
| 3,503,192 | 3/1970 | Berg et al. | 56/202 |
| 3,513,649 | 5/1970 | Berg | 56/202 |

Primary Examiner—Louis G. Mancene
Assistant Examiner—J. A. Oliff
Attorney—Joseph A. Fenlon, Jr.

ABSTRACT: A device for attaching grass catchers to power driven lawn mowers, and discloses a pair of complementary rigid frames, one at the mouth of the mower and the second at the inlet to the catcher, which interlock with each other to form a sturdy cantilever-type attachment.

PATENTED NOV 30 1971 3,624,699

SHEET 1 OF 2

INVENTOR
RALPH L. HOFFMANN

BY Joseph A Fenlon
ATTORNEY.

INVENTOR
RALPH L. HOFFMANN
BY Joseph A Fenlon
ATTORNEY.

GRASS-CATCHING ATTACHMENTS

This invention relates to grass-catching attachments.

It is the object of this invention to provide a sturdy, easily removable grass catching attachment for power driven lawn mowers.

With the above objects in view, which will become immediately apparent upon reading the specification, my invention resides in the unique novel form, construction, arrangement and combination of parts shown in the drawing, described in the specification and claimed in the claims.

Figure 2:
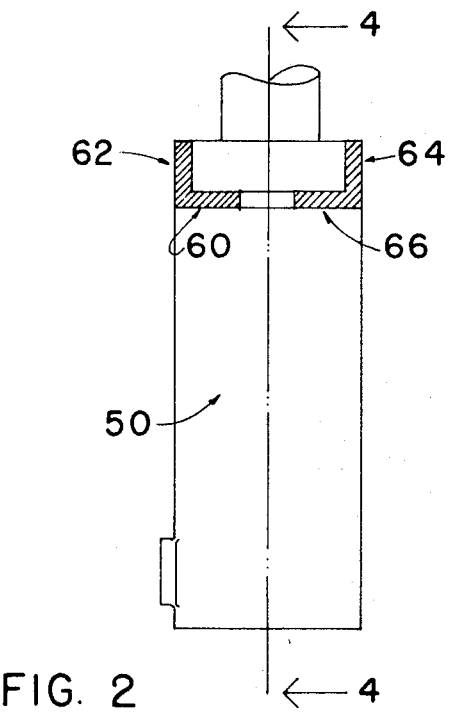
Figure 3:
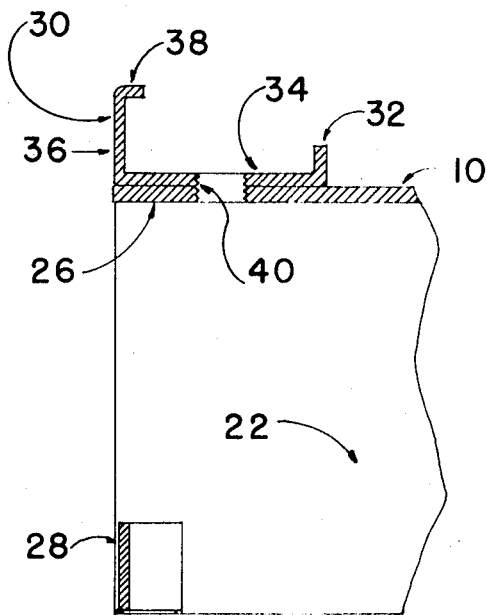
Figure 4:
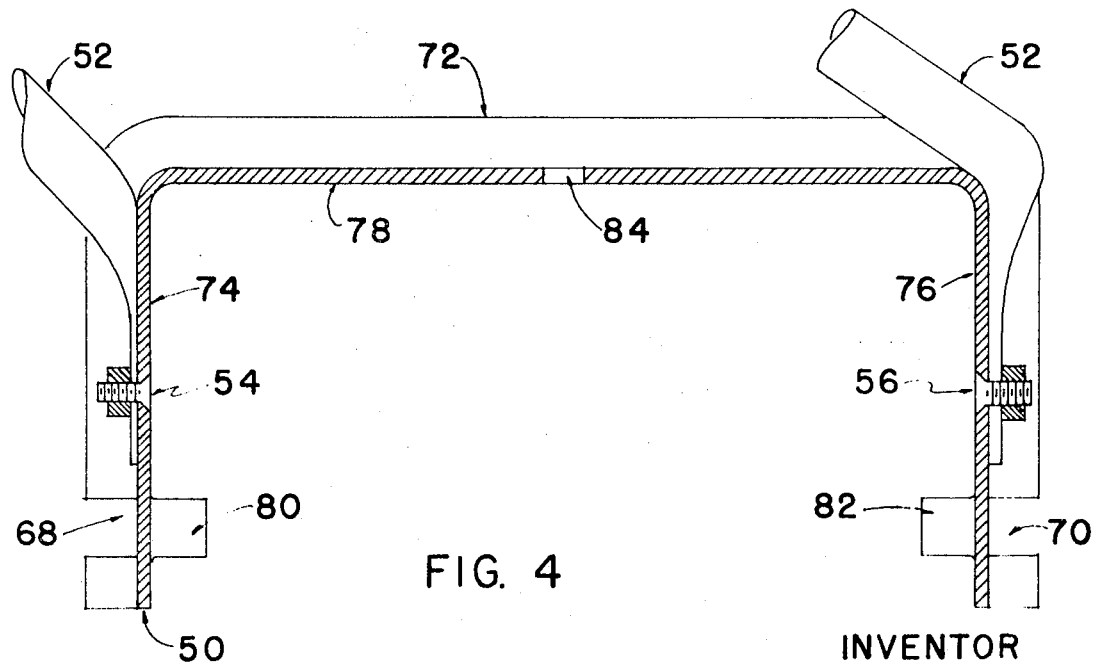

IN THE DRAWINGS:

FIG. 1 is an exploded perspective view of my inventive attachment assembly;

FIGS. 2 and 3 are enlarged sectional views taken along lines 2—2 and 3—3 respectively of FIG. 1; and FIG. 4 is a fragmentary sectional view taken along lines 4—4 of FIG. 2.

Referring now in more detail, and by reference characters to the drawings, which illustrate a preferred embodiment of my invention, A designates a power driven lawn mover having a discharge mouth 10 and B designates a grass-catching attachment including a bag-supporting framework 12 and a collecting bag 14.

The mouth 10 of the mower A is provided with an outwardly projecting flange 20 including two parallel vertical elements 22, 24, an upper horizontal bright 26, and a lower cross brace 28. Welded or otherwise rigidly secured to the upper face of the bight 26 is a bracket 30 including a short upwardly extending member 32 along the inner margin thereof, a flat horizontal member 34 in flushwise abutment with the upper bight 26, a larger outer vertical member 36 and shorter upper horizontal member 38 which projects inwardly toward the member 32. As can be seen from FIG. 3 a common threaded bore 40 extends through the member 34 and the bight 26 in the approximate center of the mouth 10. It should be here noted that all parts of the mouth 10 above described project outwardly from the remainder of the mower A as shown in the drawings.

The framework 12 of the attachment B includes a connecting frame 50 and an outrigger bar 52 which is removably secured to the frame 50 by fasteners 54, 56.

The connecting frame 50 comprises a U-shaped channel 60 including a pair of spaced upwardly extending flanges 62, 64, each sized slightly less in height than the outer member 36, and a horizontal bight element 66; the channel 60 is bent to provide a U-shaped attachment bracket including a pair of spaced depending parallel legs 68, 70, and an upper horizontal member 72.

The legs 68, 70, each are respectively provided with inwardly presented faces 74, 76 sized for overlapping disposition with the elements 22, 24, respectively and the crossmember 72 is provided with a downwardly presented face 78 sized for overlapping disposition with the bight 26. The lower portions of the legs 68, 70, are each provided with inwardly extending ears 80, 82, and the crossmember 72 is provided with a centrally located bore 84, located for alignment with the bore 40 when the attachment B is connected to the A. A conventional bag 86 is disposed about the outrigger bar 52 and the mounting frame 50.

In use, the attachment B is connected to the mower A by inserting the frame 50 between members 32 and 38 of the bracket 30 with the legs 68, 70, disposed in slightly spaced separation from the elements 22, 24, respectively of the mouth 10. The weight of the outrigger bar 52 and the bag 86 will urge the ears 80, 82 against the mouth 10 and the cross brace 28. A screw 88 inserted through the aligned bores 84, 40, secures the attachment B to the mower A in this fashion. The attachment B may be readily removed by reversing the above described steps.

In the manner shown, a readily removable but rigid attachment is achieved. A zipper 90 may be provided for ready removal of the contents of the bag 86, if desired.

It should be here understood that changes and modifications in the form, construction combination and arrangements of the various parts herein described and shown may be made without departing from the nature and principle of my invention.

Having thus described my invention, what I claim and desire to secure by Letters Patent is hereinafter described in the following claims.

a power mower having a discharge mouth defined by a pair of substantially vertical sides and substantially horizontal upper first bight;

an attachment bracket secured to said bight and including an upwardly projecting member at the outer edge of said horizontal bight of said mouth, an inwardly projecting lip at the upper end of said member, and a substantially shorter upwardly projecting stop which is parallel to and spaced inwardly from said member;

a U-shaped frame sized for overlapping engagement with the mouth of said mower and including a pair of spaced depending legs and an interconnecting second bight sized for overlapping engagement with the first bight while nestedly disposed in the attachment bracket between the member and the stop;

an outrigger bag support bar including an elongated tube which extends outwardly from the frame and which is provided at either end with a pair of flattened sections, one section being secured to one leg of the frame and the other section being secured to the other leg of the frame;

And a grass-catching bag removably draped over the support bar and including a mouth which envelope the frame;

said frame legs each including inwardly projecting ears near their lower ends sized for abutting engagement with the sides of the discharge mouth when the frame is disposed in the attachment bracket and the bag is disposed about the frame and the support bar.

2. The device of claim 1 wherein the frame comprises a U-shaped channel bent in such manner that the bight thereof is in flushwise engagement with the first bight and the sides of the discharge mouth, and the lateral margins thereof are spaced for accepting the flattened sections of the support bar.

* * * * *